(12) United States Patent
Gunzinam et al.

(10) Patent No.: US 8,940,150 B2
(45) Date of Patent: Jan. 27, 2015

(54) APPARATUS FOR MANUFACTURING FLUID REACTION PRODUCTS

(75) Inventors: Franz Gunzinam, Sulzfeld (DE); Roland Strauch, Gelsenkirchen (DE); Wolfgang Ress, Walzbachtal (DE); Ulrich Stemick, Pfinztal (DE)

(73) Assignee: Grundfos Water Treatment GmbH, Pfinztal (DE)

( * ) Notice: Subject to any disclaimer, the term of this patent is extended or adjusted under 35 U.S.C. 154(b) by 1473 days.

(21) Appl. No.: 12/599,644

(22) PCT Filed: May 15, 2008

(86) PCT No.: PCT/DE2008/000807
§ 371 (c)(1),
(2), (4) Date: Jan. 25, 2011

(87) PCT Pub. No.: WO2008/138323
PCT Pub. Date: Nov. 20, 2008

(65) Prior Publication Data
US 2011/0278173 A1 Nov. 17, 2011

(30) Foreign Application Priority Data

May 16, 2007 (DE) .......................... 01 2007 023 085

(51) Int. Cl.
*C25B 1/26* (2006.01)
*C01B 11/02* (2006.01)
(Continued)

(52) U.S. Cl.
CPC ............... *C01B 11/024* (2013.01); *B01J 14/00* (2013.01); *B01J 19/24* (2013.01); *B01J 2219/00182* (2013.01); *B01J 2219/002* (2013.01); *B01J 2219/00231* (2013.01)
USPC ........ 205/556; 205/335; 204/275.1; 422/106; 422/187

(58) Field of Classification Search
USPC .......................................... 205/556; 422/106
See application file for complete search history.

(56) References Cited

U.S. PATENT DOCUMENTS 3,929,900 A * 12/1975 Schnur et al. ................. 568/453
3,932,139 A * 1/1976 Vilceanu et al. .............. 422/148
(Continued)

FOREIGN PATENT DOCUMENTS

DE 29622838 8/1997
DE 19844179 3/2000
(Continued)

OTHER PUBLICATIONS

International Preliminary Report on Patentability for PCT/DE2008/000807, May 5, 2009.
(Continued)

*Primary Examiner* — Bryan D. Ripa
(74) *Attorney, Agent, or Firm* — Venable LLP; Robert Kinberg (57) ABSTRACT

A reactor for production of a fluid reaction product includes a reaction chamber, a plurality of fluid connections to supply fluid reactants to the reaction chamber, a reception chamber located directly below the reaction chamber, a transfer device providing a fluid connection between the reaction chamber and the reception chamber so that the reception chamber receives a fluid reaction product produced in the reaction chamber, a control unit and a first device, arranged in the reaction chamber to be in direct contact with the supplied fluids to determine a filling level. The first device includes at least one switching point which is operatively coupled with the control unit such that the supply of the fluid reactants into the reaction chamber is controlled and carried out sequentially.

18 Claims, 9 Drawing Sheets (51) Int. Cl.
*B01J 14/00* (2006.01)
*B01J 19/24* (2006.01)

(56) References Cited

U.S. PATENT DOCUMENTS

| | | |
|---|---|---|
| 6,214,296 B1 * | 4/2001 | Lou et al. .................... 422/148 |
| 6,394,043 B1 | 5/2002 | Bool, III et al. |
| 6,520,218 B1 | 2/2003 | Gregg et al. |
| 2002/0038676 A1 | 4/2002 | Siegele et al. |
| 2002/0061263 A1 | 5/2002 | Taylor |
| 2003/0138371 A1 * | 7/2003 | McWhorter et al. .......... 423/478 |
| 2004/0028569 A1 * | 2/2004 | Zorich et al. ................. 422/106 |

FOREIGN PATENT DOCUMENTS

| | | |
|---|---|---|
| GB | 2141487 A | 12/1984 |
| WO | WO-2006/077016 | 7/2006 |

OTHER PUBLICATIONS

International Search Report From PCT/DE2008/000808 Mailed Nov. 20, 2008.

* cited by examiner

APPARATUS FOR MANUFACTURING FLUID REACTION PRODUCTS

CROSS REFERENCE TO RELATED APPLICATION

This application is a 35 U.S.C. §371 filing of International Patent Application No. PCT/DE 2008/000807 filed May 15, 2008, titled DEVICE FOR THE PRODUCTION OF FLUID REACTION PRODUCTS, which claims the benefit of German Application No. 01 2007 023 085.2 titled DEVICE FOR THE PRODUCTION OF FLUID REACTION PRODUCTS, FILED May 16, 2007, which are incorporated herein by reference in their entireties.

FIELD OF THE INVENTION

The following invention relates to a device and a process for the production of fluid reaction products, in particular for the production of aqueous chlorine dioxide solution or sodium hypochlorite solution.

DESCRIPTION OF THE RELATED ART

Various devices for the production of fluid reaction products, including those for the production of aqueous chlorine dioxide solution or sodium hypochlorite solution, are known from the state of the art.

Many fluid reaction products are best suited for use if they are produced in situ or are used at least as soon as possible after production. The reason is that solutions which contain the reactive species in high concentrations are frequently unstable in the long run and decompose correspondingly rapidly into their cleavage products, this presenting the risk of undesirable intermediates or end stages to be formed resulting in an uncontrolled modification of the target concentration. Correspondingly diluted and consequently, if applicable, more stable solutions of the target reaction products require great effort regarding storage and transportation, depending on the target location of use. Chlorine dioxide in aqueous solution is such a sensitive reaction product which, in high concentrations of approximately 20 g per liter and more, rapidly forms undesirable cleavage products. In the state of the art, the preparation of chlorine dioxide takes place with an excess of hydrochloric acid in defined volume ratios in order to satisfy the stoichiometric requirements and to achieve the corresponding target levels of conversion. Consequently, monitoring the metered streams of hydrochloric acid (HCl) and sodium chlorite ($NaClO_2$) is a major aspect during preparation.

Thus, ProMinent Dosiertechnik GmbH describes in the technical data sheets for a chlorine dioxide plant "Bello Zon" 2006 a reactor for the production of chlorine dioxide which exhibits inlet apertures for the starting materials for chlorine dioxide preparation and an outlet aperture for reaction products, the starting materials being supplied to the reactor via a dosing pump and the quantity of starting materials supplied being regulated by means of a device for dosing control. This facility is equipped with numerous dosing control devices and dosing pumps which are susceptible to malfunctioning. The corresponding process for the production of chlorine dioxide carried out by means of the device requires the provision of a predetermined quantity of dilution water and the addition, controlled by the corresponding dosing control, of accurately determined quantities of hydrochloric acid and sodium chlorite by the dosing pump such that the quantities of hydrochloric acid and sodium chlorite to be added always depend on the quantity of dilution water already provided. Correspondingly, dosing errors regarding the reactants added simultaneously or in sequence cannot be offset or only with difficulty.

In the utility patent DE 296 228 38 U1, a device for the production of chlorine dioxide is claimed, the device exhibiting a mixing chamber which is essentially characterised in that the reactants are transferred into the mixing chamber via a distributor according to the invention.

In the technical data sheets for a chlorine dioxide production plant Diox-A-10 of Wallace & Tiernan GmbH, 2006, a reactor is described with a reaction chamber, a holding vessel, a receiving vessel for storing the starting materials hydrochloric acid and sodium chlorite which vessels are in fluid connection with the reactor, a counter for measuring the quantity of flow determining the input quantities of the starting materials in association with the corresponding electronic control. This plant, too, is equipped with numerous dosing pumps and dosing control devices which are susceptible to malfunctioning and cause the plant to be complex.

Patent specification DE 198 44 179 B4 presents a process for adjusting chlorine dioxide in which the redox voltage is measured and the quantity of chlorine dioxide added to a quantity of water to be disinfected is determined as a function of the free chlorine using simultaneously information gathering fuzzy logic.

A further reaction product which is just as sensitive is sodium hypochlorite which can be produced by introducing chlorine gas into caustic soda solution or by the electrolysis of a sodium chloride solution according to the following overall reaction equation $$2NaOH + Cl_2 \rightarrow NaCl + NaClO + H_2O$$

The reaction of chlorine gas being conveyed into caustic soda solution causes problems since, formally, a hydrolysis of the chlorine with subsequent neutralisation of the starting materials hydrochloric acid and/or the hypochlorous acid takes place which is accompanied by a strong release of heat such that undesirable by-products are formed. A disadvantage is consequently the heat dissipation during the production process and the necessary process optimisation regarding the reduction of the formation of undesirable by-products.

The second route for the preparation of the sodium hypochlorite suitable as a bleaching agent or disinfectant takes place via electrolysis, for the execution of which the salt is provided in an aqueous solution, the chloride ions and oxonium ions formed in solution being hydrolysed. The sodium ions and hydroxide ions forming the caustic soda solution remain. For the industrial scale reaction, it is important for the chlorine formed not to come into contact with the hydroxide ions since this would result in a chloride/hypochlorite mixture. The suitable and selective processes known from the state of the art consequently comprise the diaphragm process which is used for disinfecting swimming pools, for example, where it is critical, however, to provide an accurate dosage of the quantities to be added such that ammonia and/or amines are chlorinated beyond the stage of monochloroamine to guarantee satisfactory disinfection.

A process for the production of an alkali metal hypochlorite solution in which an undivided electrolytic cell is used is known from WO 2006/077016 A1 of Siemer et al. This document already deals with the problem of the in situ production of sodium hypochlorite in order to produce a defined concentration of the target compound since the devices known from the state of the art for the preparation of the hypochlorite may, as a result of the control and regulating systems to be used, including the necessary sensors, require highly intensive maintenance and may be unreliable. WO 2006/077016 A1 consequently describes a device with an undivided electrolytic cell in the case of which the current strength is firmly fixed in such a way that the concentration of chlorate formed during the electrolysis is limited to a maximum quantity.

The plants for the production of aqueous chlorine dioxide solution and of sodium hypochlorite solution, which are known from the state of the art, usually share the common feature of requiring a large number of dosing pumps and dosing control devices. The reactor and a corresponding vessel for holding the finished chlorine dioxide solution or sodium hypochlorite solution respectively are connected via devices of complex design which contain magnetic valves, dosing pumps and dosing control devices. These structural parts are subject to malfunctioning and wear and tear, consume energy and are therefore cost intensive.

SUMMARY

Starting from this state of the art, it is an object of the present invention to provide an improved device and a process for the production of fluid reaction products.

The above and other objects are achieved according to one aspect of the invention by the provision of a reactor for production of a fluid reaction product, which in one embodiment comprises: a reaction chamber; a plurality of fluid connections to supply fluid reactants to the reaction chamber; a reception chamber located directly below the reaction chamber; a transfer device providing a fluid connection between the reaction chamber and the reception chamber so that the reception chamber receives a fluid reaction product produced in the reaction chamber; a control unit; and a first device, arranged in the reaction chamber to be in direct contact with the supplied fluids to determine a filling level, the first device comprising at least one switching point which is operatively coupled with the control unit such that the supply of the fluid reactants into the reaction chamber is controlled and carried out sequentially.

According to a further aspect of the invention there is provided a plant for producing an aqueous chlorine dioxide solution or an aqueous sodium hypochlorite solution, comprising: a reactor as described above; a housing in which the reactor is arranged at least partially; and at least one starting material reservoir coupled to the reactor and to a water inlet.

According to yet a further aspect of the invention, there is provided a process for production of a fluid reaction product using the reactor as described above, which comprises, in one embodiment, the steps of: a) supplying a first reactant to the reaction chamber; b) bringing into contact of the first reactant in the reaction chamber with the first device for the determination of the filling level; c) measuring the filling level of the reactant; d) triggering a signal on reaching a first switching point; e) transferring the signal to the control unit such that the control unit effects an operation for regulating the supply of reactants; and f) repeating steps a) to e) until a desired number of the reactants has been supplied sequentially in n sequences and as a function of n switching points to the reaction chamber in a controlled manner.

The practical examples of the present invention relate to a device for the production of a fluid reaction product which device is equipped with a reaction chamber with a device arranged therein for determining the filling level which device is in communication with a control unit such that the supply of reactants to the reaction chamber can be advantageously regulated, taking its filling level in the reaction chamber into consideration. The termination of the reactant supply can simultaneously trigger the supply of a subsequent reactant such that the sequential supply of several fluid reactants to the reaction chamber takes place in a controlled manner without dosing errors being able to occur. In this way, fluid reaction products produced from a plurality of reactants can be produced reliably in a most simple manner in accurate concentrations.

In a further practical example, a fluid connection is established between the reaction chamber and a reception chamber for reaction product such that the reaction product can flow into the reception chamber immediately after its production.

One practical example relates to a transfer device which provides a fluid connection between the reception and the reaction chamber. The transfer device is designed in a simple manner as co-axially formed siphon as a result of which the use of valves subject to wear and tear can be advantageously dropped. Moreover, operation by an operator is no longer necessary when using the siphon designed according to the invention or an overflow respectively. In this way, the device as a whole becomes advantageously simple as regards its design, cost effective, and exhibits a low susceptibility to wear and tear.

Further practical examples relate to the design of the transfer device.

Finally, practical examples relate to a further device for the determination of the filling level which device is arranged in the reception chamber and which is in direct contact with the transferred reaction product, the device for the determination of the filling level also exhibiting a switching point through which the control unit is caused to effect an operation. On emptying of the reception chamber and reaching the measured minimum filling level, a new production of reaction product such as chlorine dioxide solution or sodium hypochlorite solution can thus be advantageously instigated or, alternatively, a batch that has already been freshly produced and is present in the reaction chamber can be caused to flow across and fill the reception chamber. In this way, fresh product which is of defined consistent quality is thus advantageously available for use at all times.

A further practical example relates explicitly to the preparation of an aqueous chlorine dioxide solution from the reactants water, hydrochloric acid and sodium chlorite. Advantageously, water is presented in the reaction chamber before, after reaching a first switching point determining the target filling level of the water, the control unit causes the addition of the hydrochloric acid and then the sodium chlorite until the desired volumes thereof have been supplied. The reaction to chlorine dioxide takes place in the water that has been presented and the solution formed is diluted to the desired constantly consistent concentration by a final addition of water up to a last switching point, this providing a guaranteed quality of the chlorine dioxide solution.

Yet a further practical example relates to the preparation of an aqueous sodium hypochlorite solution from the reactants water and sodium chlorite brine, the device having been supplemented by an electrolytic cell for the in situ electrolysis of sodium chlorite brine such that, advantageously, sodium hypochlorite is produced directly in solution and then diluted with water to the desired dilution level, the presentation of the brine and the supplementation with dilution water being effected by means of the low maintenance components according to the invention for the determination of the filling level such that a sodium hypochlorite solution with a constant concentration is produced while avoiding the formation of by-product.

Finally reference is made in a further practical example to an apparatus or a plant for the production of product which facility comprises the device according to the invention for the production of fluid reaction products, in particular for the production of aqueous chlorine dioxide solution or, alternatively, of sodium hypochlorite solution. This apparatus comprises advantageously also the ingenious arrangement of starting material tanks and reaction and reception chambers and all fluid connections in a housing which protects the entire arrangement against external influences. Advantageously, a consumption system can be fed directly with the product solution since this is not subject to any quality variations.

These and other advantages will be described in further detail in the following description with reference to the figures.

BRIEF DESCRIPTION OF THE FIGURES

The reference for the figures in the description serves the purpose of backing the description. Items or parts of items which are essentially identical or similar can be provided with the same reference symbols. The figures are merely a schematical illustration of practical examples of the invention. The following is shown.

DETAILED DESCRIPTION

The subject matter of the present invention serves the purpose of producing fluid reaction products which are formed when two or more reactants or "starting materials" are reacted in the presence of a solvent to form a "product". Basically, the solvent may be an organic or inorganic solvent; solvent mixtures which can be formed in the reaction chamber by combining two or more solvent components such as water and alcohol are also coming into consideration.

Chlorine dioxide $ClO_2$ is such a reaction product which is formed from sodium chlorite $NaClO_2$ and hydrochloric acid $HCl$ in water $H_2O$. The expert knows further reaction products which can be prepared analogously to the above $ClO_2$-preparation. A further reaction product is sodium hypochlorite $NaOCl$ or, respectively, an aqueous solution thereof, which should also be produced advantageously directly before use for the proportion of dissociation products to be as low as possible when the solution is utilized.

The device according to the invention comprises, for the production of the fluid reaction product, a reactor with a reaction chamber, a device arranged in the reaction chamber for the determination of the filling level, a plurality of fluid connections for supplying fluid reactants to the reaction chamber and a control unit. Since the device for the determination of the filling level is in direct contact in the reaction chamber with the fluids supplied and since the device for the determination of the filling level comprises switching points corresponding to the number of reactants supplied, which switching points are in operational contact with the control unit, the supply of the fluid reactants to the reaction chamber can thus be regulated. Switching point should thus be understood to mean that levels of fill, respectively, points at which, when reached, the device for measuring the filling level transmits a signal to a control unit are defined along the height of the reaction chamber whose internal volume is known exactly.

The control comprises by measuring the filling level of one component up to its desired filling level corresponding to the corresponding switching point not only the determination of the corresponding volumes of the reactants supplied, but also the simultaneous control as to if and when a subsequent reactant is transferred into the reaction chamber. Thus, a controlled sequential supply of reactants is performed advantageously.

The reaction chamber has a direct fluid connection to a reception chamber via a transfer device such that the transfer of product can take place by making use of the force of gravity. "Fluid connection" should be understood to mean that two locations are connected with each other in such a way that a fluid can flow monodirectionally or bi-directionally between them, the flow, if necessary, being enhanced by conveying means such as pumps or similar.

In principle, the reception chamber can also be arranged, if necessary, at a distance below the reaction chamber or, if spatial constraints possibly require it, also to the side or at a distance to the side of the reaction chamber. However, in that case, additional mechanisms such as pumps and other devices are correspondingly required for the fluid transfer between the reaction chamber and the reception chamber.

The reception chamber may additionally be equipped with an electrolysis cell which may exhibit a semi-cylindrical recess such that it can be partially arranged around the central section of a cylindrical transfer device for transferring the product into a reception chamber.

In the preferred embodiments illustrated figuratively, a simple co-axially designed siphon is used for the transfer which is effective and hardly susceptible to malfunctioning and provides the device with the corresponding robustness and durability while being easy and adroit to handle.

Essentially, both the reaction chamber as well as the reception chamber communicate in the device according to the invention with a control unit as a result of which communication between the two chambers takes place and the control unit causing operations to be carried out, corresponding to the filling level of the correspondingly supplied reactants, respectively, of the product, which operations effect the filling and emptying of the corresponding chambers. This means that a reactant which had been introduced into the corresponding chamber up to a switching point and which is thus present therein in the desired volume triggers a signal via the device for the determination of the filling level which is passed to a control unit and triggers a subsequent operation therein.

If the control unit is coupled with a corresponding reactant reservoir, such an operation may, for example, consist of stopping the supply of reactants. Further operations may consist of causing the transfer of a subsequent reactant—in the case of corresponding coupling to a second reactant reservoir—or of causing a pause or an idle period. A device for the determination of the filling level in the reception chamber which is a storage facility or reservoir for finished product ready for use, may measure the corresponding filling level as "empty" therein and cause, through a corresponding signal to the control unit, the supply of product which is present fully completed in the reaction chamber or the production of new product.

Figure 1:
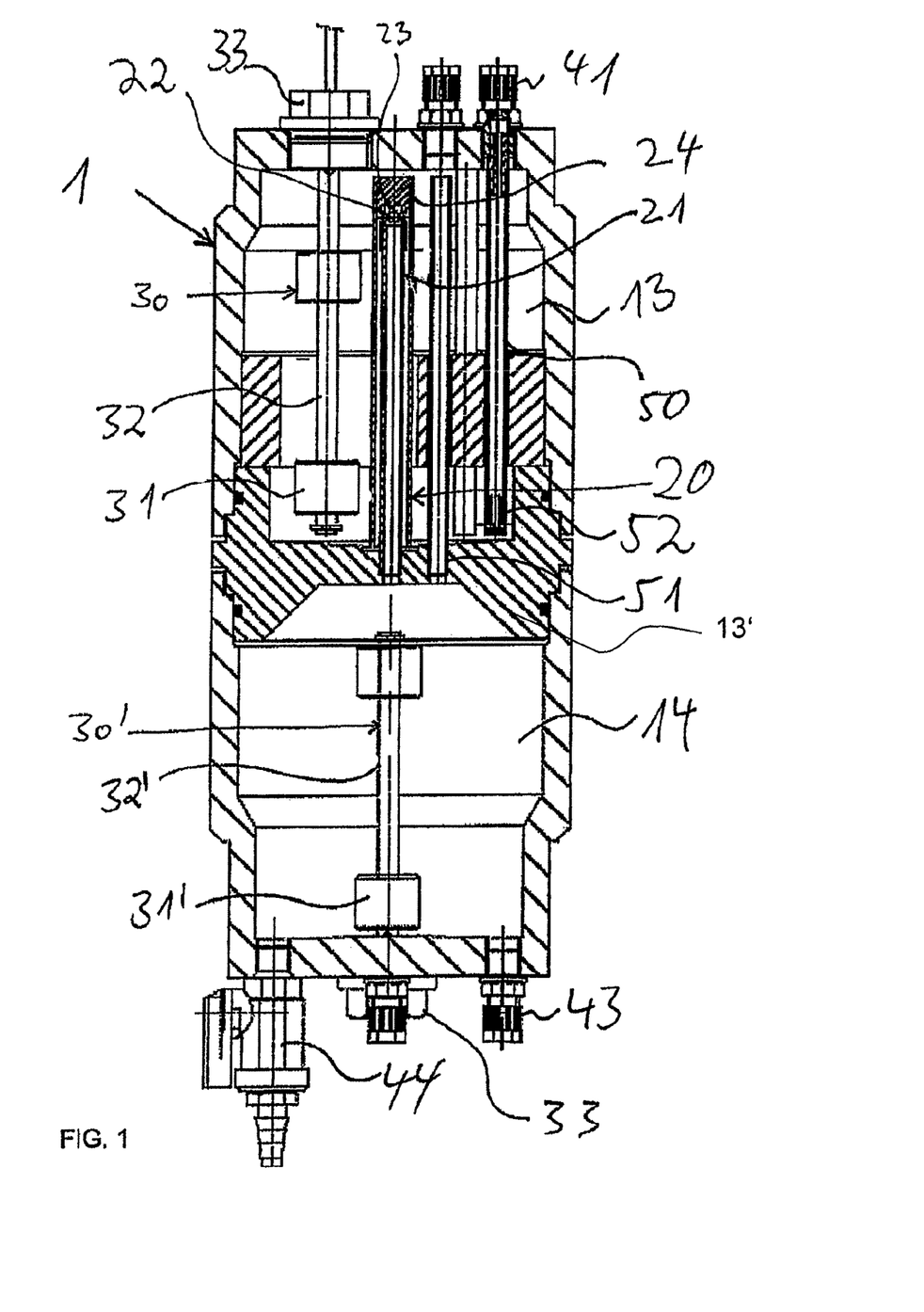
FIG. 1 shows a longitudinal sectional view of the reactor chamber and the reception chamber of the device for the production of an aqueous chlorine dioxide solution.

FIG. 1 shows a device 1 according to the invention for the production of a chlorine dioxide solution. The device 1 comprises a reactor with a reaction chamber 13 in which a first device for the determination of the filling level is arranged.

Figure 1A:
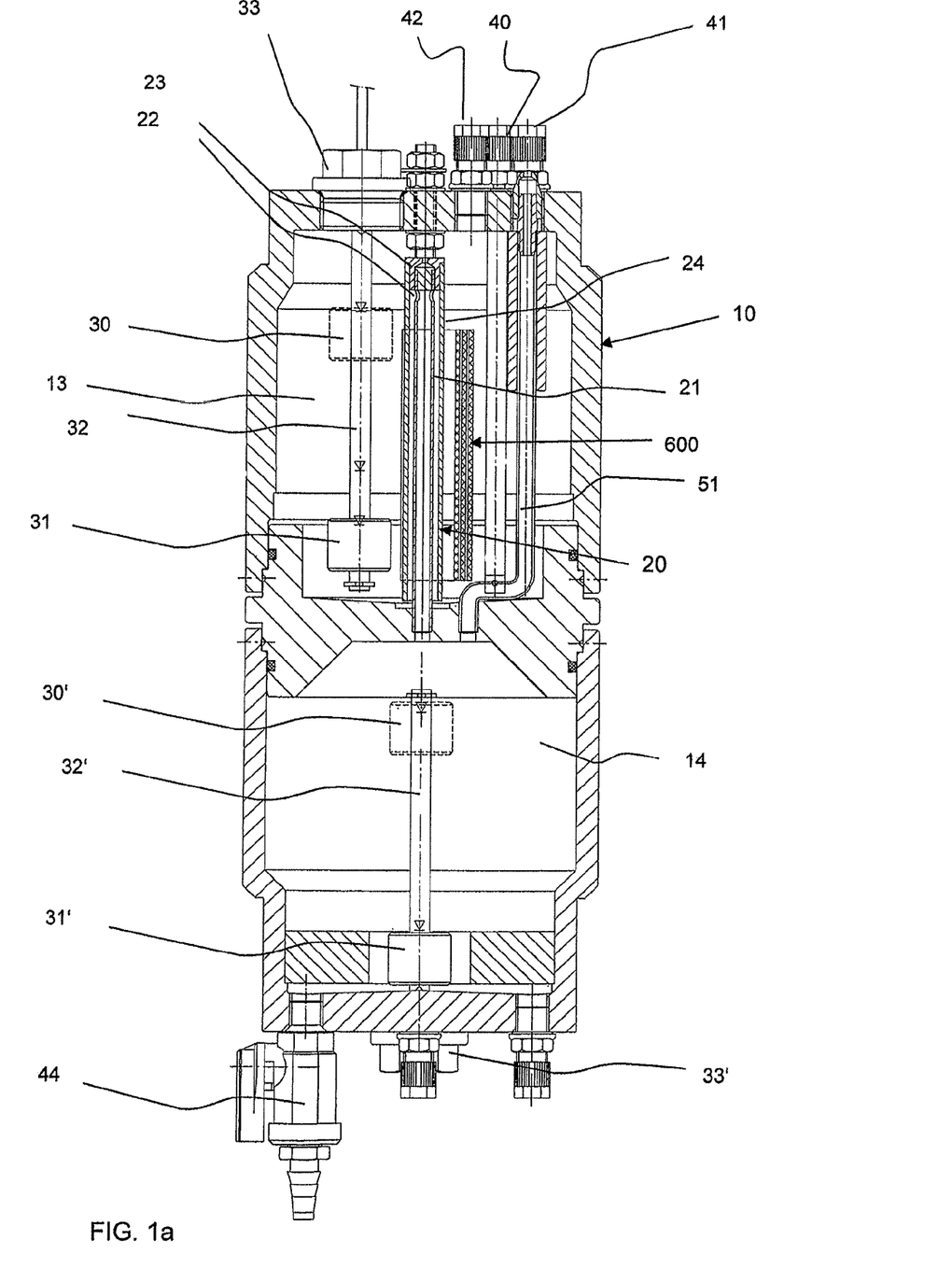
FIG. 1a shows a longitudinal sectional view of the reactor chamber and the reception chamber of the device for the production of a sodium hypochlorite solution.

FIG. 1a shows the device 10 according to the invention for the production of a sodium hypochlorite solution. The device 10 comprises additionally to the components contained in device 1 also an electrolysis cell 600 arranged in the reaction chamber 13 which cell has the purpose of providing a brine which is presented as a liquid reactant.

Figure 4:
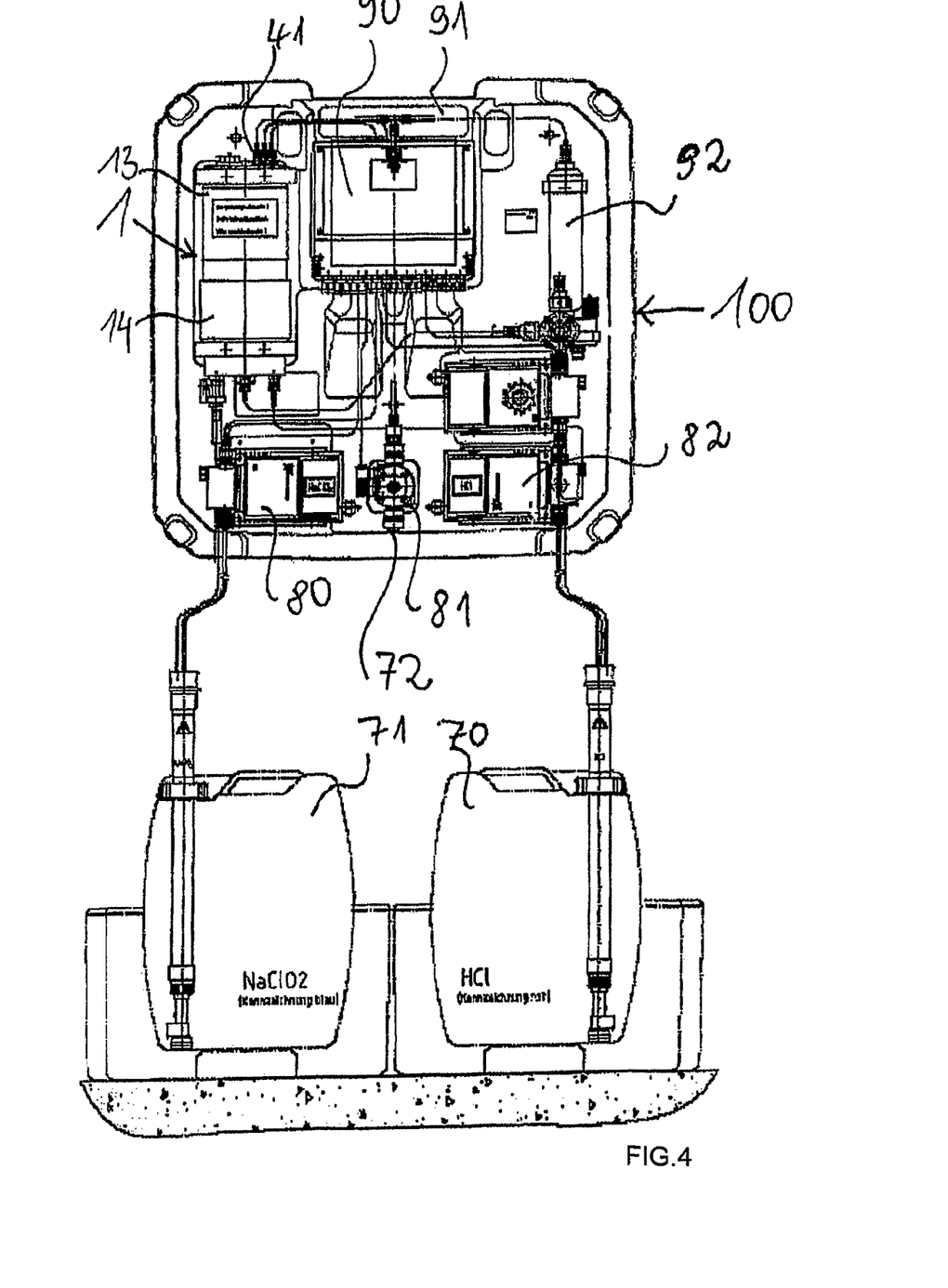
FIG. 4 shows a front view of a chlorine dioxide plant with the device for the production of an aqueous chlorine dioxide solution.
Figure 4A:
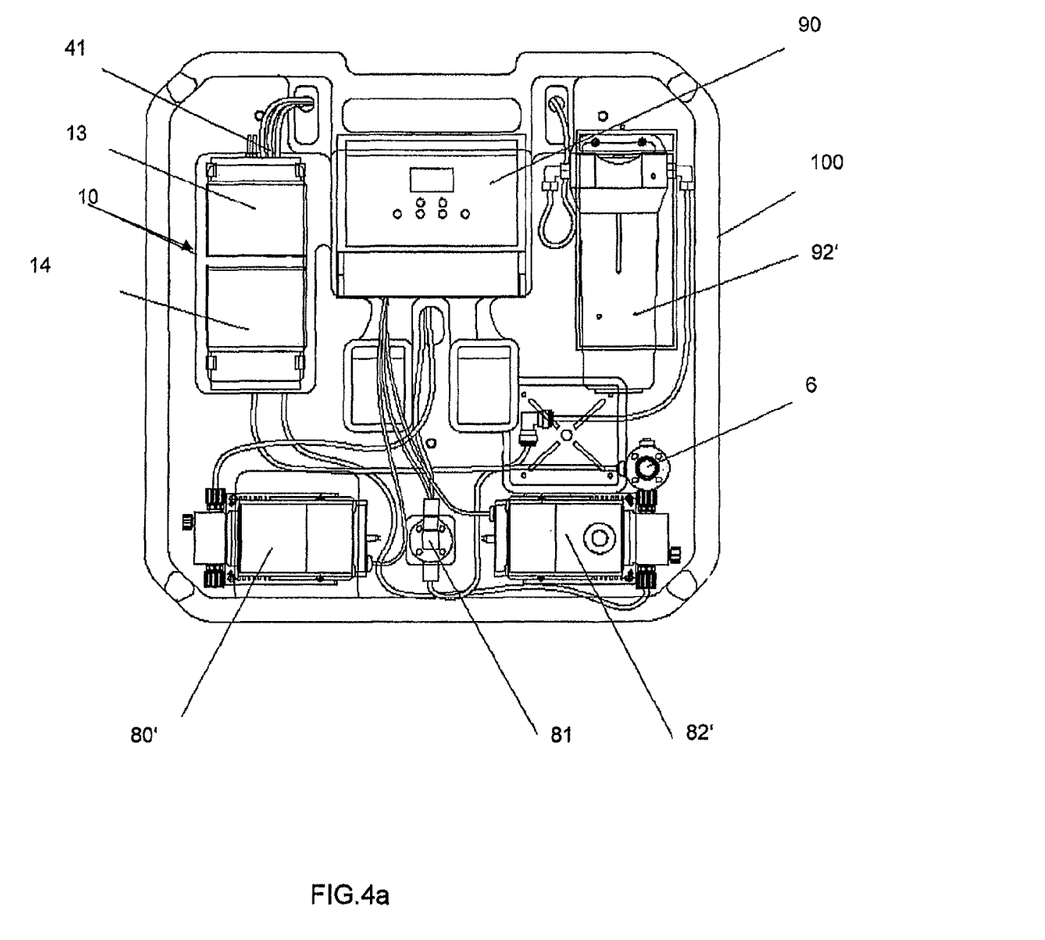
FIG. 4a shows a front sectional view of a plant for the production of sodium hypochlorite solution with the device comprising the electrolysis cell and the reactor chamber and the reception chamber for the production and reception of the aqueous sodium hypochlorite solution.

A plant is provided for the production of chlorine dioxide which comprises the device 1 according to the invention. Since the supply of water, sodium chlorite and hydrochloric acid is required, appropriate reservoirs 71, 70, as shown in FIG. 4, have a fluid connection, via supply lines and pumps, with the reaction chamber 13. The supply of the reactants may take place via hoses or pipes from the corresponding reservoirs which may, for example, be casks, via connection 41 shown in FIG. 1 or via further connections which are not visible due to the kind of illustration. The reservoirs are not shown in FIG. 1. Water is, incidentally, usually supplied via a pipeline which in the present case is also referred to as reservoir.

Usually, one reservoir is available for each starting material which reservoir is connected to the reaction chamber 13 through a pipeline via connection 41. However, it is also conceivable that a plurality of reservoirs open into a joint pipeline upstream of connection 41 and that the selective supply of a specific reactant takes place via T-pieces, valves or similar devices into the reaction chamber via the connection.

Via connection 41, water is transferred into the reaction chamber 13 in the reactor shown in FIG. 1 for the preparation of chlorine dioxide, as the first reactant via a pipe lance 50 extending into the reaction chamber 13. The water is allowed to flow into the reaction chamber 13 until the desired filling level is measured via a device for the determination of the filling level 30 which, in the present case, is formed as a floating lance 32 to which a float 31 is fitted in such a way that it can move along the longitudinal axis of the lance 32 downwards and upwards. This desired filling level is defined as being the so-called "switching point" at which the signal that a desired filling level has been reached is transferred to a control unit which is not figuratively shown in FIG. 1.

This causes an operation for regulating the further procedure to take place which may consist of causing the supply of a second reactant such as hydrochloric acid HCl, for example, to take place. This operation may also involve the provision of an instruction that a certain pause interval should be maintained between the supply of two reactants which interval will be in the region of around 10 to 20 seconds in the case of the present reactions but which may be longer or shorter, i.e. in the region of 5 to 45 seconds or which, in the limit case, may take place directly, i.e. after zero seconds or after a long pause of a minute or even more. These pauses relate to the idle periods which may occur between the supplyings of two reactants; following the addition of the last reactant, whereby herein "reactant" may also mean the solvent water, a longer pause or "maturing period" may occur lasting up to 1 hour though being rather in the region of a few minutes, approximately 10-20 minutes, since it is rather not desirable to let the device stand still for a too long time during continuous operation.

In principle, a float can interact with a float lance in a magnetic, optical or capacitive manner or in another way. In the case of the combination of float 31 and lance 32 shown in FIG. 1, the float is equipped with a magnet which communicates with electrical contacts of the float lance 32. The float 31 thus floats up to a switching point marked in the lance 32, subsequently communication takes place between the float 31 and the lance 32 which indicates that the desired level of the reactants in the reaction chamber 13 has been reached and the supply of the reactant is stopped. Subsequently, the supply of a second reactant can be caused by an operation of the control unit.

For the preparation of chlorine dioxide in the present case, water is first supplied via a pipe lance 50 to the reaction chamber 13 until the float 31 reaches the first switching point. Via a second pipe lance 50 which is not illustrated figuratively since it is arranged spatially quasi behind the first pipe lance 50, hydrochloric acid HCl is added until the float 31 reaches the second switching point. Analogously, the addition of sodium chlorite $NaClO_2$ takes place via a further pipe lance 50 until the third switching point is reached. All the reactants for the preparation of aqueous chlorine dioxide solution are now present and the reaction takes place until a reaction equilibrium is reached. In order to allow the solution to mature, the maturing time can now be allowed to take place which, corresponding to the reactor volume, may be within the range of a few seconds up to as much as one hour. Generally, it is of course also possible to store the solution much longer in the reaction chamber if this provides a clear advantage.

At the end of this maturing period, water $H_2O$ is added once more until the fourth switching point and thus also the target concentration is reached.

The readily prepared solution remains in the reaction chamber 13 at least until the device for the determination of the filling level 30' which is arranged in the reception chamber 14 and in the present case also comprises a float 31' which moves up and down on a float lance 32' sends a signal as a result of the sinking of the float 31' in the reception chamber 14 below the switching point for a minimum level to a control unit which is also operatively coupled with the second device for the determination of the filling level 30'.

This signal can now trigger an operation which either causes a further addition of water in the reaction chamber 13 such that the water exceeding the fourth switching point in the reaction chamber 13 causes the readily prepared product solution to flow into the reception chamber 14 by means of the transfer device 20. The consequence of this is that the float 31' rises in the reception chamber and thus triggers an operation for the interruption of the addition of water to the reaction chamber 13.

Figure 2:
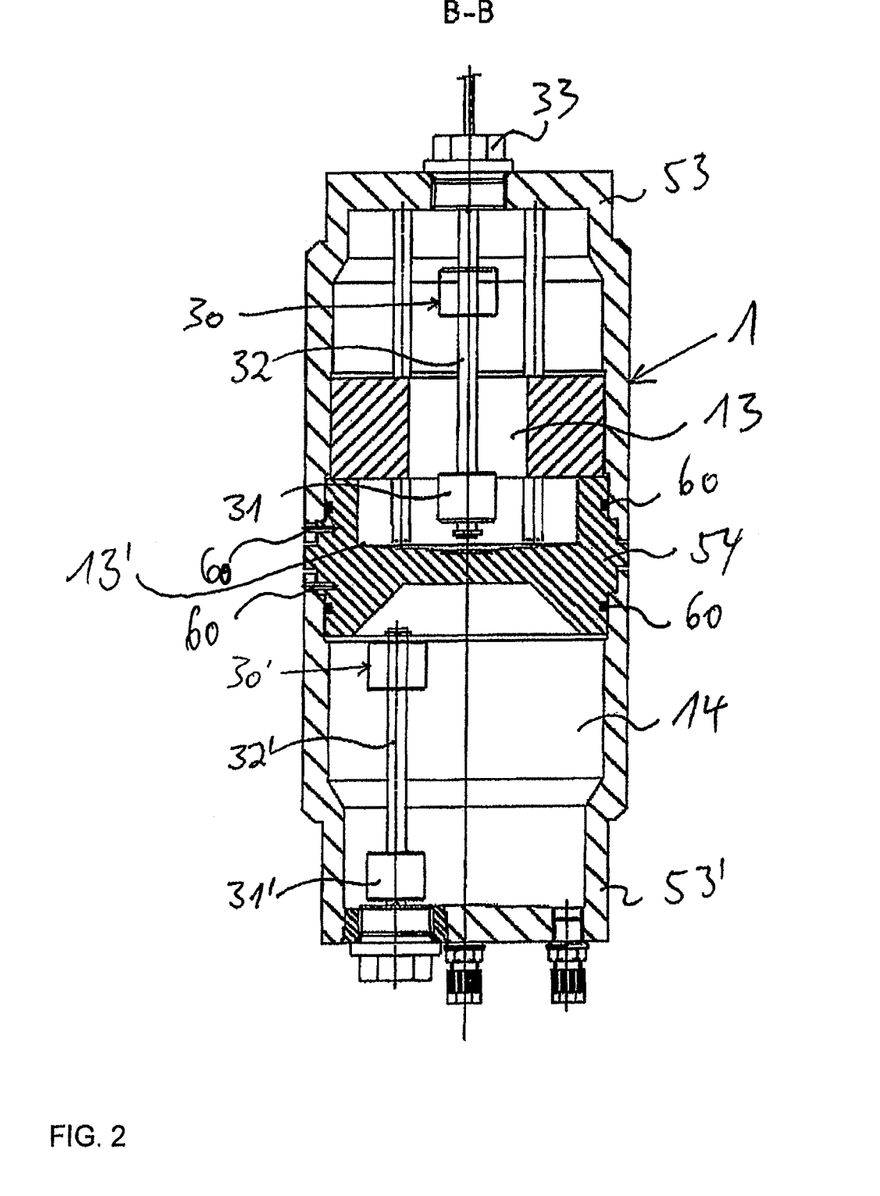
FIG. 2 shows a longitudinal sectional view of the device from FIG. 1 along a line of intersection B-B for the production of a chlorine dioxide solution.

The devices for the determination of the filling level 30, 30', which are also illustrated in FIG. 2, may be realized by identically constructed floats 31, 31" and float lances 32, 32', in which the switching points are arranged; however, it is also possible for the floats 31, 31' or the lances 32, 32' to have different designs as a result of geometrical or other requirements. They may also differ with respect to their functioning. Generally, it is also conceivable that the filling level of at least one of the two chambers 13, 14 is determined optically or in another way. An implementation of an optical measurement optimizes the utilization of the internal spaces.

The transfer device 20 is, in the present case, formed by an inner tube 21 and outer tube 24 arranged co-axially around the former, which tubes are both arranged vertically with respect to the floor 13' of the reaction chamber 13. The inner tube 21 passes through the floor of the reaction chamber 13' and opens into the reception chamber 14. The two pipe diameters are dimensioned such that a small gap is formed between the pipes 21, 24 the width of which is sufficiently small for lifting forces to act onto a liquid present therein.

The outer tube 24 is provided at its upper end with a closure 23 similar to a cap. The closure 23 of the outer tube 24 rests in this case on the upper end of the inner tube 24 such that the outer tube 24 is supported, quasi borne, by the inner tube 21. The outer tube 24 has a certain tube length which is so short that a gap is formed between the floor of the reaction chamber 13' and the lower end of the outer tube 24 which gap allows liquid to pass through. The reaction product, chlorine dioxide in this case, can thus pass from the reaction chamber 13 through this gap between the bottom end of the outer tube 24 and the reaction chamber floor 13' into the gap between the pipes 21, 24 and rise. Since the inner tube 21 is equipped with a transverse bore as flow transfer aperture 22, the reaction product can pass through this flow transfer aperture 22 into the inner chamber of the inner tube 21 and flow into the reception chamber 14. In this way, a pressure drop occurs in the inner tube 21 which is propagated into the outer tube and ensures that the reaction chamber 13 is emptied completely. The reaction product is passed from there via a connection 43 arranged on the floor of the reception chamber 14 to a load. The ball cock 44 serves the purpose of sampling and emptying the reception chamber.

The expert is familiar with the design possibilities for such a flow transfer aperture 22 and the possible geometries. One or several transverse bores of different aperture cross-sections can be used.

Figures 3A, 3B:
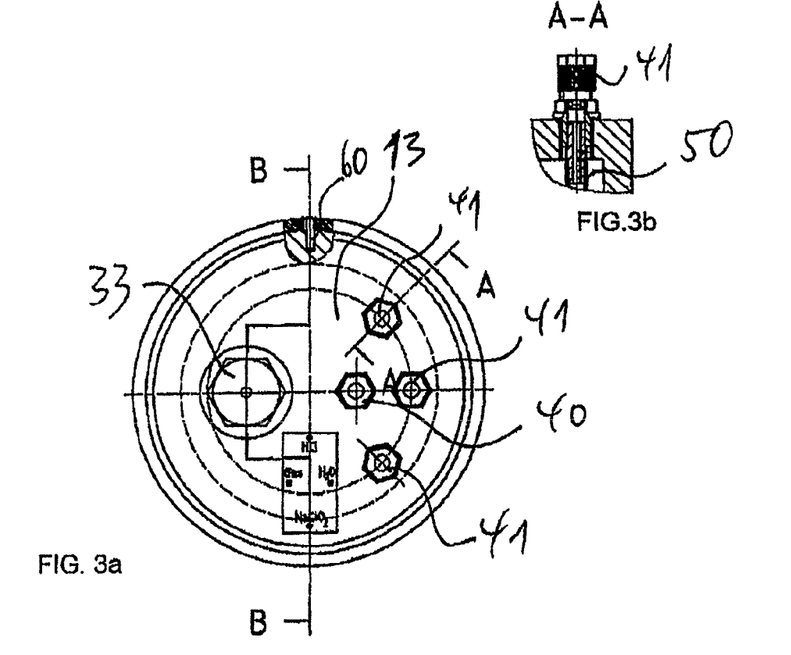
FIG. 3a shows a cross-sectional view of the reaction chamber of the device for the production of an aqueous chlorine dioxide solution.
FIG. 3b shows a partial longitudinal sectional view along a line of intersection A-A of the cross-sectional view of the reaction chamber of FIG. 3a, FIG. 3c shows a side view of the reaction chamber and a part of the reception chamber of the device for the production of an aqueous chlorine dioxide solution.

FIG. 3a shows the reaction chamber as a top view such that all three connections 41 for a device producing chlorine dioxide and a fourth connection 40 which is in connection with a ventilation pipe for pressure relief are shown here. Obviously, a reaction chamber created for the preparation of another fluid reaction product could exhibit a correspondingly larger or smaller number of connections. In addition, the float switch 33 is shown which provides the electronic connection to a control unit, not shown here.

In the present case, each connection 41 terminates in a pipe lance 50 (see FIG. 1) which extends deeply into the reaction chamber 13. The depth of the corresponding pipe lance 50 which may terminate in a lance end piece 52 may be made dependent on whether the pipe lance is used for a reactant supplied earlier or later; in the present case, the starting materials consist of hydrochloric acid, HCl, sodium chlorite $NaClO_2$ and water $H_2O$. The length of the pipe lance for water which is supplied first could be selected larger than the length of the pipe lance for hydrochloric acid and the length of the pipe lance for hydrochloric acid could be selected larger than the length of the pipe lance for sodium chlorite.

The lance end piece 52 shown here exhibits a transverse bore which serves the purpose of improving the flow distribution. Other suitably formed lance end pieces are also conceivable which improve the flow distribution in the reaction chamber. In principle, however, the pipe lance needs not terminate in a special end piece.

Further, a ventilation pipe 51 is provided in the device which pipe projects from the connection 40 into the reaction chamber 13 through the floor 13' of the reaction chamber 13 and as far as a head space of the reception chamber 14 in order to provide equalization of pressure. It is coupled via connection 40 with a volume reservoir not illustrated figuratively which, in the present case, comprises an expandable bag which opens to the ambient air via a small pipe filled with activated carbon and serving the purpose of purifying the air.

In FIG. 4, the device 1 according to the invention is arranged in a plant for the production of a chlorine dioxide solution. The starting materials water, hydrochloric acid and sodium chlorite are transferred from the corresponding reservoirs 70, 71, which are arranged below the device 1 placed in a housing 100, by means of conveying devices into the reaction chamber 13 of the device 1. Each conveying device is controlled via the control unit 90. Further, the control unit 90 is equipped with a feature for time control. In the present case, the conveying devices are diaphragm pumps 80, 82 and/or a magnetic valve 81; however, a hose pump, lifting piston pump, centrifugal pump, gear pump or another suitable pump can also be used.

The fluid connection between reservoirs 70, 71 and the water intake 72 and the reaction chamber 13 is effected by means of a hose; however, pipe arrangements or canulae are also conceivable. The device 1 according to the invention is connected with a volume reservoir 91 for pressure equalization and is open towards the atmosphere via an activated carbon filter 92.

All structural parts of the device 1 consist of an acid-resistant material, preferably polyvinyl chloride PVC. In a preferred practical example, the float consists of polyvinylidene fluoride PVDF.

In FIG. 3a a practical example of the device 1 according to the invention is shown in which the connections 40, 41 for the implementation of pressure equalization and for supplying water, hydrochloric acid and sodium chlorite are arranged.

Figure 3C:
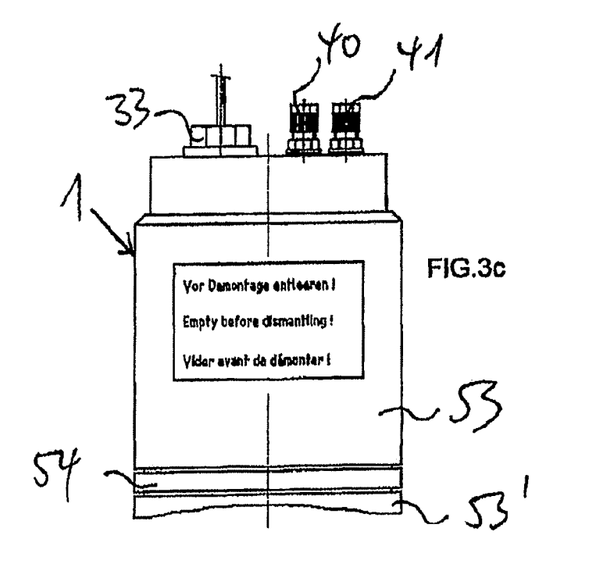

FIG. 3b shows a connection 41 from FIG. 3a in detail which is connected with the pipe lance 50. FIG. 3c, on the other hand, shows a side view of the reaction chamber and part of the reception chamber of the device for the production of an aqueous chlorine dioxide solution.

FIG. 2 shows a section through the device 1 along the line B-B, which is defined in FIG. 3a. The two chambers 13, 14 for the reaction and for reception are surrounded by corresponding reactor and storage housings 53, 53', which are connected with each other through a connection 54. In order for the fit of the two housings 53, 53' to be optimal, grooved pins 60 are provided which allow the housings 53, 53' and the intermediate piece 54 to be arranged on top of each other only in an accurate position. In this way, the openings from the reaction and the reception chamber 13, 14 are congruent optimally.

Thus, the process for the production of a fluid reaction product is carried out using the device according to the invention in such a way that, firstly, a first reactant is transferred into a reaction chamber and there brought into contact with a device for the determination of the filling level. The latter is thus able to measure the filling level of the reactant and to trigger a signal on reaching a first switching point. The signal is transferred to a control unit in such a way that this correspondingly carries out an operation for regulating the supply of the reactants. The above steps are repeated until a desired number of reactants has been passed sequentially and as a function of a corresponding switching point into the reaction chamber in a controlled manner. It is thus possible to cause defined volumes of desired reactants to react with each other in a simple manner without dosing errors being able to occur. A consistent product quality is thus guaranteed together with a simplified design of the reactor such that the process overall can be carried out economically.

If the process for the production of chlorine dioxide is employed, it is possible to begin with the supply of water from a first reservoir into the empty reaction chamber. The water level rises up to the first switching point, a signal from the first device for the determination of the filling level is then transferred to the control unit whereupon the supply of water is stopped and the supply of hydrochloric acid from a second reservoir into the reaction chamber begins. Once the level of liquid reaches the second switching point, the first device for the determination of the filling level transfers once more a signal to the control unit whereupon the supply of hydrochloric acid is stopped and the supply of sodium chlorite from a third reservoir is started. Once the level of liquid reaches the third switching point, the first device for the determination of the filling level dispatches a signal to the control unit whereupon the supply of sodium chlorite is stopped. Optionally, a maturing time for the reaction of the starting materials to the reaction product can now be kept during which the process is in abeyance. This may be a period in the region of 1 second to 60 minutes, preferably the maturing time will be approximately 15 to 35 minutes. On completion of the maturing time, the control unit causes the further supply of water from the reservoir to take place. Water is supplied until the liquid level reaches the fourth switching point and the first device for the determination of the filling level transfers a signal to the control unit whereupon the supply of water is stopped. Thereby, for the present, the production of product is terminated.

To allow the device for the production of chlorine dioxide to be operated further, the product is transferred into a reception or storage chamber from which it can be passed to a load. If the second device for the determination of the filling level in the reception chamber of the control unit then reports that the reception chamber is empty, the control unit causes the supply of water to take place to the reaction chamber causing the liquid in the capillary gap of the siphon to rise up to the flow transfer such that the product is transferred into the reception chamber. The level of liquid which has risen therein causes immediately due to the coupling of the device for the determination of the filling level in the reception chamber with the control unit, the supply of water to the reaction chamber to be interrupted. Draining of the reaction chamber via the transfer device under a lever effect causes complete emptying of the reaction chamber by suction.

If the float in the reaction chamber reports a complete emptying, the introducing of the starting materials takes place anew. The finished solution can be passed from the reception chamber to a load.

In this way, a load can be supplied quasi-continuously with chlorine dioxide which is present in an ever constant quality. The device according to the invention can be arranged in a housing 100, as shown in FIG. 4, which can be situated close to the load such that a fluid connection ready for operation is present via intersections to the load and the reception chamber 14. If the facility is arranged suspended on a wall or held by a stand, reservoirs 71, 70 can easily be positioned below the housing whereby a space saving arrangement is achieved.

Figure 2A:
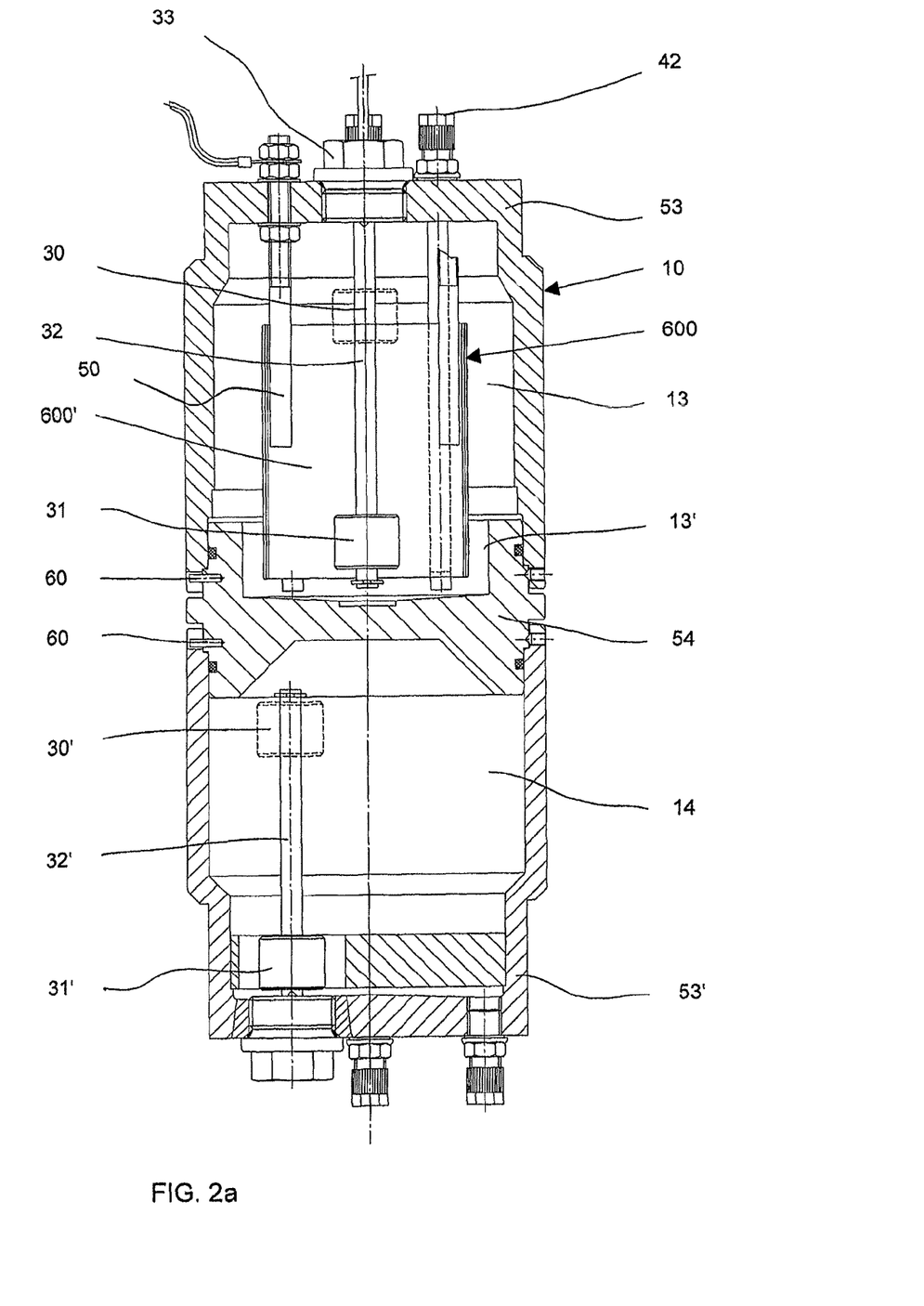
FIG. 2a shows a longitudinal sectional view of a reactor unit along a line of intersection B-B for the production of a sodium hypochlorite solution.
Figure 3D:
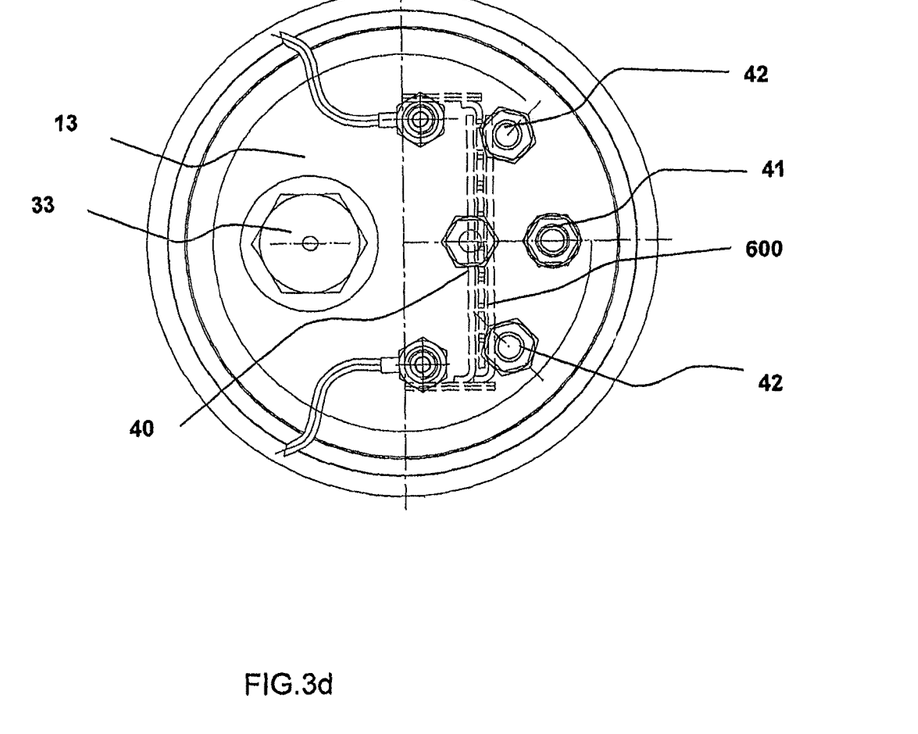
FIG. 3d shows a cross-sectional view of the reaction chamber of the device for the production of an aqueous chlorine dioxide solution.
Figure 4B:
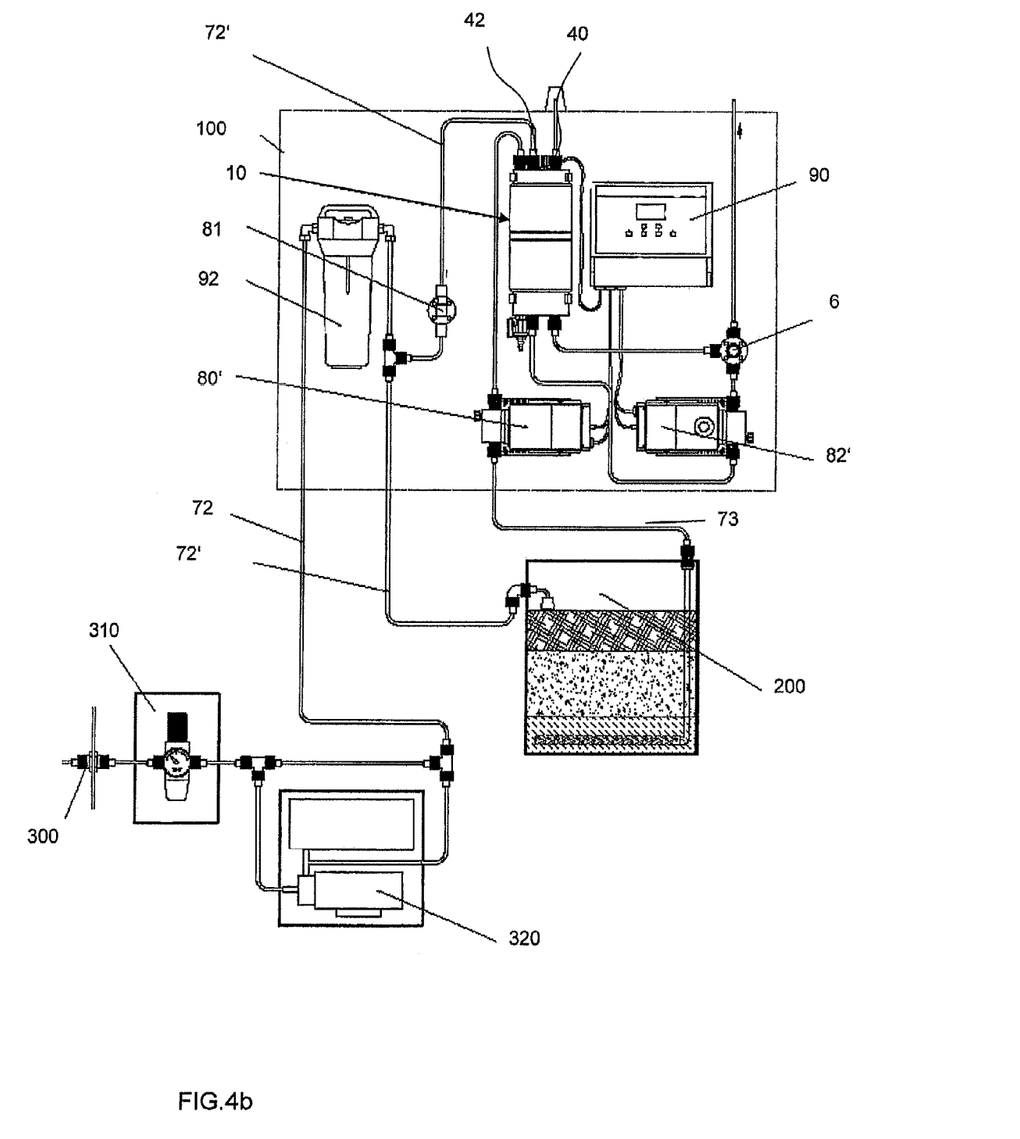
FIG. 4b shows a front sectional view of a plant for the preparation of sodium hypochlorite solution with the device comprising the electrolysis cell and the reactor chamber and the reception chamber for the production and reception of the aqueous sodium hypochlorite solution with the storage container for salt and pressure increase and/or pressure reduction unit.

As an alternative, sodium hypochlorite can be produced by means of the device according to the invention, as shown in FIGS. 1a, 2a and 3d as well as 4a, if an electrolysis cell is provided in the reaction chamber 13. This is coupled correspondingly with an energy supply via the head of the reactor. Since merely the supply of water and a brine solution of sodium chloride is required, a salt container 200 is merely provided as a brine reservoir, as shown in FIG. 4b. The salt container 200 is filled with commercial salt tablets up to a certain level, a saturated salt concentration being obtained after some time. In addition, water is required as reactant which is passed to the reactor via a corresponding connection 42. Such a connection also serves the purpose of supplying the brine.

In addition, the water can advantageously be passed via the water softener 4 before it is passed to the salt container 200 for the production of brine or as dilution water to the reaction chamber 13. Correspondingly, a water supply 72 is distributed after the water softening unit 92 by means of T-pieces in two lines 72'. The water supply line 72' leading into the reaction chamber can be passed through a magnetic valve 81. The salt container 200 supplied by the water supply line 72' is filled permanently to a certain water level by means of float valves.

On commencement of the operation of the device in the present case, brine solution is transferred as first reactant into the reaction chamber 13 via a connection 42 and a pipe lance 50 extending into the reaction chamber. The salt solution is dosed by means of the dosing pump 80' into the reaction chamber 13 until the float 31 reaches a certain level, i.e. a first switching point. The dosing pump 81' which is in communicative connection with the switching point via a control switches off then again. Subsequently, the magnetic valve 81 in the water supply 72 opens and softened water is also dosed into the reaction chamber 13 until the float 31 also reaches here a certain switching point, i.e. a further level. Subsequently, the magnetic valve 81 closes and the filling of the reaction chamber 13 is completed.

Analog to the embodiment of the device according to the invention shown in FIG. 1, the float 31 moves up and down along the float lance 32 of the longitudinal axis of lance 31 in order to measure the desired filling level. This desired filling level is the "switching point" described above at which the signal that the desired filling level has been reached is transferred to a control unit 90 shown in FIG. 4a.

An electrolysis cell 600, see FIG. 1a, is then activated and the electrolysis takes place for a few minutes, preferably in the range of 1 to 60 minutes, depending on the brine volume to be reacted.

During this reaction period, the sodium hypochlorite solution is formed. After deactivation (switching off) of the electrolysis cell 600, the magnetic valve 81 is re-opened and further water is dosing additionally as water of dilution into the reaction chamber 13. The rising level of the solution ensures that a lifting effect takes place in the transfer device 20 and the sodium hypochlorite solution produced flows through the flow transfer aperture 22 and through the inner tube 21 into the reception chamber 14.

Once the float 31 in the reaction chamber 14 reaches a preset defined switching point—the float is then indicated as float 30 by a broken line—the magnetic valve 81 is closed again. After some time, the entire solution thus passes from the reaction chamber 13 into the reception chamber 14.

Once the entire mixture has been transferred and this has been measured by the float 31 present in the reception chamber, the float being drawn at the maximum filling level as float 30' by a broken line, the production of the sodium hypochlorite solution is again triggered in the reaction chamber 13 and first the salt solution and subsequently the softened water are then introduced again and the electrolysis cell 600 is activated subsequently.

If cell 600 is then deactivated again, the position of the float 31' can be set to determine whether the magnetic valve 81 is open or not. If the liquid level in the reception chamber 14 is above the first switching contact of the lance 32', the magnetic valve 81 remains closed. If, as a result of the dosed removal of the discharge dosing pump for sodium hypochlorite 82', see FIG. 4b, the liquid level is below the first switching point of the float lance 32', the magnetic valve 81 opens in order to dose water into the reaction chamber 13 in order to trigger the lifting effect again which allows the solution to flow out from the reaction chamber 13 into the reception chamber 14.

The hydrogen peroxide formed during the reaction is discharged via connection 40, see FIG. 3d.

The float shown in FIG. 1 operates in the same way as that shown in FIG. 1a. It can interact with the float lance magnetically, optically or capacitatively or interact with it in another way. In the combination of float 31 and lance 32 shown in FIGS. 1, 1a the float is equipped with a magnet which communicates with electrical contacts of the float lance. The float 31 thus floats up to a switching point marked in the lance 32, a communication between the float 31 and the lance 32 then takes place which indicates that the desired level of the reactants has been reached in the reaction chamber 13 and the supply of reactant is stopped. Subsequently, the supply of a second reactant can be caused to take place by an operation of the control unit.

The transfer device shown in FIG. 1 corresponds to that shown in FIG. 1a. From FIG. 1a it becomes additionally clear how the ventilation pipe 50 which serves the purpose of discharging hydrogen gas, is arranged. The discharge of hydrogen takes place in this case also from the head space of the reaction chamber 13 directly via corresponding lines 50 in the reception chamber and/or connection 40. FIG. 2a shows the device 10 from the rear and clearly illustrates the arrangement of the floats 31' and the switching points 30, 30'.

FIG. 3d shows the reaction chamber as a top view such that all connections 40, 41, 42 are shown; in addition, the geometry of the electrolysis cell 600 is clearly shown which exhibits a semi-cylindrical recess such that it can be fitted to the flow transfer device.

The entire production facility with the device 10 is supplied with water via a water connection 300, the required pre-pressure for the plant being advantageously between 2-7 bar. At a pre-pressure which is over 7 bar, a pressure reduction valve 310, see FIG. 4b, should be used in order to prevent the plant components from being damaged. If the required pre-pressure is below 2 bar, a pressure increase device 320 can be used.

| LIST OF REFERENCE SYMBOLS | |
| --- | --- |
| 1 | Device for the production of a fluid reaction product |
| 6 | Flow transfer valve |
| 10 | Device for the production of a fluid reaction product |
| 13, 13' | Reaction chamber with floor |
| 14 | Reception chamber |
| 20 | Transfer device |
| 21 | Inner tube |
| 22 | Flow transfer device/transverse bore |
| 23 | Closure |
| 24 | Outer tube |

-continued

| LIST OF REFERENCE SYMBOLS | |
| --- | --- |
| 30, 30' | Device for the determination of the filling level |
| 31, 31' | Float |
| 32, 32' | Float lance |
| 33, 33' | Float switch/filling level sensor |
| 40 | Connection for degassing |
| 41 | Connection for gas equillibration |
| 42 | Connection for dosing of water or salt solution |
| 43 | Connection for product discharge |
| 44 | Outlet |
| 50 | Pipe lance |
| 50' | Ventilation line |
| 51 | Ventilation pipe for pressure equilibration |
| 52 | Lance end piece |
| 53 | Housing of the reaction chamber |
| 53' | Housing of the reception chamber |
| 54 | Intermediate piece |
| 60 | Grooved pin |
| 70, 71 | Reservoir |
| 72, 72' | Water inlet |
| 73 | Brine inlet |
| 80 | Diaphragm pump, pump for salt solution |
| 81 | Magnetic valve |
| 82 | Diaphragm pump |
| 82' | Pump f. sodium hypochlorite |
| 90 | Control unit |
| 91 | Volume storage |
| 92 | Water softening unit |
| 100 | Housing |
| 200 | Salt container |
| 300 | Operating water supply line |
| 310 | Pressure reduction unit |
| 320 | Pressure increase unit |
| 600 | Electrolysis cell |
| 600' | Inner chamber of the electrolysis cell |

The invention claimed is:

1. A reactor for production of a fluid reaction product, comprising:
    a reaction chamber;
    a plurality of fluid connections to supply fluid reactants to the reaction chamber;
    a reception chamber located directly below the reaction chamber;
    a transfer device providing a fluid connection between the reaction chamber and the reception chamber so that the reception chamber receives a fluid reaction product produced in the reaction chamber wherein the transfer device includes an inner tube and an outer tube arranged co-axially around the inner tube so that both tubes are arranged essentially perpendicularly to a floor of the reaction chamber, the inner tube passing through the reaction chamber floor and opening into the reception chamber, there being a first gap with a gap width between the inner and outer tubes, which width is suitable to allow the fluid reaction product to rise in the gap as a result of lifting forces, and the outer tube having an upper end and a closure included at the upper end;
    a control unit; and
    a first device, arranged in the reaction chamber to be in direct contact with the supplied fluids to determine a filling level, the first device comprising at least one switching point which is operatively coupled with the control unit such that the supply of the fluid reactants into the reaction chamber is controlled and carried out sequentially.

2. The reactor according to claim 1, further comprising a second device to determine a filling level arranged in the reception chamber for being in direct contact with the reaction product transferred into the reception chamber, the second device including at least one switching point which is operationally coupled with the control unit so that the transfer of the reaction product from the reaction chamber into the reception chamber is controllable.

3. The reactor according to claim 1, wherein the inner tube has an upper end connected to the closure of the outer tube so the outer tube is supported by the inner tube and a second gap is present between a bottom end of the outer tube and the floor of the reaction chamber, which second gap permits the reaction product to enter through the second gap into the first gap between the tubes.

4. The reactor according to claim 1, wherein the upper end of the inner tube includes a flow transfer aperture, which aperture permits transfer of the reaction product from the first gap through the flow transfer aperture and through the inner tube into the reception chamber.

5. The reactor according to claim 1, and further comprising reservoirs each for containing a respective one of the reactants and a controllable fluid conveying device operatively coupled between each reservoir and the reaction chamber for the transfer of reactants to the reaction chamber under control of the control unit.

6. The reactor according to claim 1, wherein the first device for the determination of the filling level is one of a magnetically, optically or capacitively operated device.

7. The reactor according to claim 1, wherein the first device for the determination of the filling level comprises a float and a float lance in which the switching points are arranged.

8. The reactor according to claim 7, wherein the first device is a magnetically operated device that includes a magnet arranged in the float and the float lance comprises electrical contacts which communicate with the magnet such that, on reaching a switching point, a signal is transferable to the control unit in order to effect an operation of the control unit.

9. The reactor according to claim 1, wherein the reaction chamber comprises a plurality of pipe lances for the supply of reactants, each pipe lance comprising a lance end piece.

10. The reactor according claim 1, further comprising an electrolysis cell arranged in the reaction chamber.

11. The reactor according to claim 10, wherein the transfer device has a central section and the electrolysis cell has an approximately rectangular cross-section with a semi-cylindrical longitudinal recess and surrounds the central section of the transfer device partially concentrically.

12. The reactor according to claim 1, wherein:
the fluid reaction product is an aqueous chlorine dioxide solution or an aqueous sodium hypochlorite solution; and
the fluid reactants comprise hydrochloric acid HCl, sodium chlorite $NaClO_2$, aqueous sodium chloride solution and water $H_2O$.

13. The reactor according to claim 1, further including a pressure equillibration device arranged between the reception chamber and the reaction chamber.

14. A plant for producing an aqueous chlorine dioxide solution or an aqueous sodium hypochlorite solution, comprising:

a reactor according to claim 1;
a housing in which the reactor is arranged at least partially; and
at least one starting material reservoir coupled to the reactor and to a water inlet.

15. A process for production of a fluid reaction product using the reactor according to claim 1, comprising the steps of:
a) supplying a first reactant to the reaction chamber;
b) bringing into contact of the first reactant in the reaction chamber with the first device for the determination of the filling level;
c) measuring the filling level of the reactant;
d) triggering a signal on reaching a first switching point;
e) transferring the signal to the control unit such that the control unit effects an operation for regulating the supply of reactants; and
f) repeating steps a) to e) until a desired number of the reactants has been supplied sequentially in n sequences and as a function of n switching points to the reaction chamber in a controlled manner.

16. The process according to claim 15, wherein the steps a)-e) are carried out with water as the first reactant, hydrochloric acid as a second reactant, sodium chlorite as a third reactant and water as a fourth reactant, and the supply of water taking place to the first switching point, the supply of hydrochloric acid to a second switching point, the supply of sodium chlorite to a third switching point and a repeated supply of water to a fourth switching point.

17. The process according to claim 15, wherein the steps a)-e) are carried out with sodium chloride solution as the first reactant and water as the second reactant and the supply of sodium chloride being effected up to the first switching point and the supply of water up to a second switching point, an electrolysis cell being operated for a desired period following the supply of the sodium chloride.

18. The process according to claim 15, wherein the reactor further comprises an electrolysis cell arranged in the reaction chamber, and a second device to determine a filling level arranged in the reception chamber for being in direct contact with the reaction product transferred into the reception chamber, the second device including at least one switching point which is operationally coupled with the control unit so that the transfer of the reaction product from the reaction chamber into the reception chamber is controllable,
the process further comprising the steps of:
aa) transferring the reaction product from the reaction chamber to the reception chamber;
bb) contacting the reaction product with the second device for the determination of the filling level in the reception chamber;
cc) measuring the filling level of the reaction product;
dd) triggering of a signal on reaching a switching point of n+1 which indicates a state of emptiness of the reception chamber; and
ee) transferring the signal to the control unit such that the control unit executes an operation for the control of the repeated supply of the reactants to the reaction chamber.

* * * * *